Figure 1:
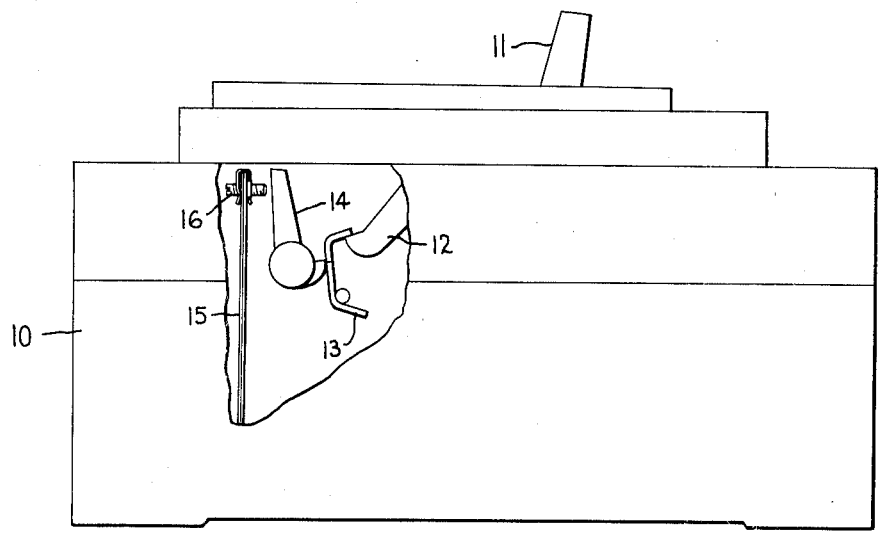

Sept. 14, 1965　　　C. F. HOBSON, JR　　　3,206,584
ADJUSTABLE ACTUATING MEANS WITH U-SHAPED SPRING RETAINER
Filed Oct. 3, 1963

INVENTOR.
CHARLES F. HOBSON, JR.
BY Robert A. Casey
ATTORNEY

United States Patent Office 3,206,584
Patented Sept. 14, 1965

3,206,584
ADJUSTABLE ACTUATING MEANS WITH U-SHAPED SPRING RETAINER
Charles F. Hobson, Jr., Southington, Conn., assignor to General Electric Company, a corporation of New York
Filed Oct. 3, 1963, Ser. No. 313,655
4 Claims. (Cl. 200—166)

My invention relates to adjustable actuating means with retaining means, and particularly to actuating means comprising a movable member carrying an adjusting or calibrating screw and means for retaining the adjusting or calibrating screw in adjusted position.

In many devices, such, for example, as in electric circuit breakers, the setting of a calibrating screw is extremely critical to the proper operation of the device. Because of this, the setting of the calibrating screw of such a device is a very exacting task and constitutes an important aspect of its construction and use. It is essential, therefore, that once the calibrating screw has been set, it should not be unintentionally changed such as by vibration or shock.

Accordingly, in many applications, such as in electric circuit breakers, it has been the custom for many years to perform an adjusting operation on calibrating screws of this type, and then, in order to retain the screw in position, to fasten it permanently by soldering or cementing. Fixing calibrating screws in this manner, however, is relatively expensive and time consuming. In addition, there is always the possibility of error creeping in because of the screw being disturbed during such fastening operation.

Moreover, in carrying out the adjustment of such devices, it is usually necessary that a first test be made, followed by an adjustment, and then the device be allowed to stand and later be subjected to a second test, following which a second adjustment or re-adjustment is made. In some cases this procedure must be repeated three or four times. Thus it has been common practice to solder a calibrating screw in place after the first test and then, if upon second test it is found that the calibration should be changed, it has been necessary to re-heat the assembly until the solder is again melted and to perform a second adjusting operation while the device is hot enough to maintain the solder in liquid form. All of these procedures are relatively difficult, time consuming, expensive, and capable of introducing error.

It is an object of the present invention to provide adjustable actuating means which, following initial adjustment, will retain its position despite vibration and shock, without the necessity of performing a separate fastening operation such as soldering.

It is another object of the invention to provide adjustable actuating means including retaining means which will permit adjustment and will retain the adjusting screw in adjusted position and which will permit re-adjustment without a separate loosening operation.

It is another object of the invention to provide such an adjustable actuating means which is inexpensive and easily assembled.

In accordance with the invention in one form, an adjustable actuating means is provided such as suitable for use in an electric circuit breaker, comprising an elongated strip of bimetallic material which is fixedly mounted at one end and has a tapped hole adjacent its movable end. A calibrating screw is threadedly engaged in the tapped hole and disposed and arranged to engage a releasing mechanism of the circuit breaker when the bimetallic strip deflects a predetermined amount. For the purpose of adjustably retaining the calibrating screw in position in accordance with the invention, a generally U-shaped wire clip is provided which is positioned on the end of the bimetallic strip so as to straddle the end of the bimetallic strip. The side portions of the U-shaped clip are inclined toward each other through their intermediate portion and the clip as a whole is dimensioned so that the inwardly inclined portions of the sides engage opposite side portions of the calibrating screw in such a way as to resiliently hold the clip in mounted position.

In a preferred form of the invention, the tapped hole in which the calibrating screw is carried has a drawn collar, and one leg of the U-shaped wire clip presses against this collar, while the other leg presses against the calibrating screw. In either case, the action of the wire clip is to resiliently bias the calibrating screw against the sides of the threaded hole in which it is carried, creating frictional force which retains the screw against accidental movement.

The invention will be more fully understood from the following detailed description, and its scope will be pointed out in the appended claims.

Figure 2:
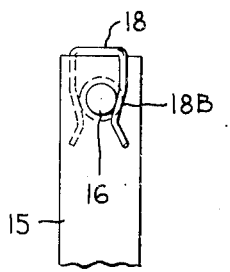
Figure 3:
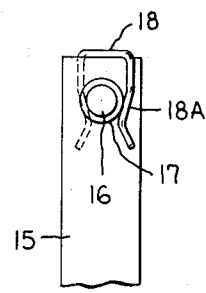
Figure 4:
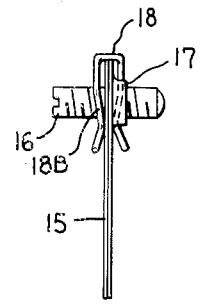
Figure 5:
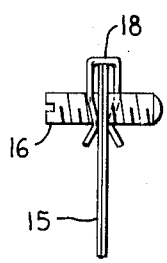

In the drawing,
FIGURE 1 is a side elevation view of an adjustable actuating means in accordance with the invention, shown for convenience as incorporated in an electric circuit breaker;
FIGURE 2 is an elevation view, on enlarged scale, of the actuating device of FIGURE 1;
FIGURE 3 is a view similar to FIGURE 2 but showing the reverse side of the device;
FIGURE 4 is an edge view of the actuating device of FIGURE 2, and
FIGURE 5 is a view similar to FIGURE 4 but showing another embodiment of the invention.

In FIGURE 1, the invention is shown as incorporated in an electric circuit breaker comprising an insulating casing 10 having a manually operable handle member 11 projecting from the top wall thereof. The circuit breaker 10 includes a pair of separable contacts, not shown, and terminals, not shown, whereby the contact may be connected in series relation in a circuit. The circuit breaker 10 also includes operating mechanism, not shown, for operating the separable contacts so as to make and break a circuit when the contacts are opened and closed. The operating mechanism may be of any suitable type including a member 12 which is normally restrained but which when released causes automatic opening of the circuit breaker contacts. The releasable member 12 may be releasably restrained in operative position by latch means such as by the latch member 13 which in turn is releasably held in latching position by a trip bar member 14. The arrangement of the trip bar 14 is such that upon rotation of the trip bar 14 slightly in clockwise direction as viewed in FIGURE 1, the latch member 13 is released and is permitted to rotate slightly counterclockwise, thereby releasing the releasable member 12 and causing automatic opening of the contacts.

For the purpose of moving the trip bar to releasing position upon the occurrence of predetermined current conditions, a bimetallic strip member 15 is provided, together with heating means, not shown, for generating heat in the bimetallic strip in accordance with the current flowing through the circuit breaker. The heating means may, for instance, comprise a heater conductor, not shown, disposed closely adjacent the bimetallic strip 15, or as an alternative, the current passing through the breaker may be caused to flow through the bimetallic strip itself thereby generating heat therein. In either case, the bimetallic strip 15 is disposed and arranged so that when heated it warps so as to move the free end thereof to the right, as viewed, to engage the trip bar 14.

For the purpose of adjusting the sensitivity of the circuit breaker 10, the bimetallic strip 15 is provided with a calibrating screw 16 which is threadedly engaged in a tapped hole adjacent the free end of the bimetallic strip. The hole in which the calibrating screw 16 is carried is surrounded at one side of the strip by a raised collar or "drawn" portion 17 (see FIGURE 4). When the bimetallic strip warps to the right, the end of the calibrating screw 16 engages the upper portion of the trip bar 14, causing clockwise rotation thereof and release of the latch means in the manner previously described.

For the purpose of adjustably retaining the calibrating screw in position in accordance with the invention, a restraining clip 18 is provided, formed of wire.

The wire clip 18 is disposed so as to straddle the end of the bimetallic strip 15, and to have one leg 18A thereof against the outside of the collar 17 adjacent one flat surface of the strip 15, and the other leg 18B, bearing against the screw 16 adjacent the other flat side surface of the strip 15.

The portions 18A and 18B are preferably inclined toward each other, and the outermost end portions thereof are bent outwardly to permit easier assembly. Once the clip has been assembled on the screw, the action of the side portions 18A and 18B, one against the screw, and the other against the collar 17, is such as to retain the clip in place on the screw despite vibration or shock.

The clip 18 is preferably dimensioned so that when placed in position as previously described, the leg portions 18A and 18B will be resiliently forced apart, and exert a corresponding pressure on the screw 16. The pressure thus exerted is constant, and there is no lost motion or "back-lash" when the screw is turned. This is because the resilient force exerted by the clip 18 acts between the bimetal 15 and the screw 16, which must move relative to each other if the screw is to move at all.

This arrangement is to be contrasted to schemes in which a spring member resiliently grips a screw at two opposed points and prevents motion of the screw with respect to a base member by reason of the spring member being restrained from motion with respect to the base member. In most arrangements of this type it is necessary that the spring member be positively attached or anchored to the base member if all play or lost motion is to be avoided. (This is because such arrangements ordinarily do not exert a force pressing the calibrating screw against its threads.)

In the embodiment illustrated in FIGURE 5, however, a form of the present invention is shown including a spring member which resiliently grips a screw at two points but which also exerts a force pressing the calibrating screw against its threads.

In this form, the collar 17 is omitted, and each leg of the spring clip bears directly on the screw 16, on opposite sides of the bimetallic member. Because the legs of the spring member engage the screw at two axially displaced points, the spring exerts a twisting action on the screw, thereby pressing the screw against the threads of the hole and restraining it from accidental movement.

In applications where it is desirable in order to meet safety regulations or for some other reason, to permanently and positively fasten a calibrating screw after adjustment, such as by soldering or by use of cement, the use of the retaining clips of the present invention will also be found very desirable. This is because it is often necessary to perform more than one calibrating operation on devices of this type. By use of the present retaining clips, it is unnecessary to solder or cement the screw after each adjustment. The clip retains the screw in adjusted position. After the final adjusting operation has been performed, the screw may then be soldered or cemented.

While the invention has been shown in only two particular embodiments, it will be readily apparent that many modifications thereof may readily be made, and I therefore intend by the appended claims to cover all such modifications as fall within the true spirit and scope of the invention.

What I claim as new and desire to secure by Letters Patent of the United States is:

1. An adjustable actuating device comprising:
  (a) a generally wide, thin, flat actuating member having a tapped hole adjacent one edge thereof;
  (b) a calibrating screw threadedly engaged in said tapped hole and including portions projecting at each side of said actuating member;
  (c) a generally U-shaped resilient metallic retaining member carried by said actuating member and straddling said edge portion adjacent said tapped hole, said retaining member having one leg portion extending at one side of said actuating member and its other leg portion extending at the other side of said actuating member, the intermediate portion of said retaining member being stressed so as to resiliently urge said leg portions toward said calibrating screw;
  (d) at least one of said leg portions bearing against said calibrating screw;
  (e) said resilient retaining member acting on said calibrating screw to urge said calibrating screw against the inner side of the wall portions of said tapped hole whereby said calibrating screw frictionally resists accidental movement due to vibration or shock.

2. An adjustable actuating device comprising:
  (a) an actuating member of sheet material having a tapped hole therein adjacent one edge thereof;
  (b) a calibrating screw threadedly engaged in said tapped hole and including portions projecting at each side of said actuating member;
  (c) a generally U-shaped resilient wire retaining member carried by said actuating member and straddling said edge portion adjacent said calibrating screw;
  (d) said actuating member including a raised collar portion adjacent said tapped hole at one side thereof;
  (e) said retaining member having a first leg portion extending adjacent said raised portion at one side of said actuating member and having the other leg portion extending into engagement with said calibrating screw;
  (f) said intermediate portion of said retaining member urging said leg portions toward said calibrating screw, whereby said first leg is resiliently biased against said raised collar and said second leg portion is resiliently biased against said calibrating screw, whereby to resiliently urge said calibrating screw against the inner side wall portion of said tapped hole to frictionally resist accidental movement due to vibration or shock.

3. An adjustable actuating device comprising:
  (a) an actuating member of sheet metallic material having a tapped hole adjacent one edge thereof;
  (b) a calibrating screw threadedly engaged in said tapped hole and including portions projecting at each side of said actuating member;
  (c) a generally U-shaped wire retaining clip straddling said edge portion of said actuating member adjacent said hole;
  (d) said actuating member having a raised collar portion surrounding said tapped hole at one side of said actuating member;
  (e) said retaining member having one leg portion thereof resting against said collar portion of said actuating member and having the other leg portion thereof resting against said calibrating screw;
  (f) said engaging portions of said leg members being inclined toward each other and disposed and arranged to engage said calibrating screw and said collar portion of said actuating member at the side thereof opposite said edge portion, whereby the resilient bias of the said leg portions toward each other tends to pull said retaining clip onto said actuating member and retain it in position on said calibrating screw.

4. An adjustable actuating device comprising:
(a) an actuating member of sheet material having a tapped hole adjacent one edge thereof;
(b) a calibrating screw threadedly engaged in said tapped hole and including portions projecting at each side of said actuating member;
(c) a generally U-shaped resilient metallic retaining member carried by said actuating member and straddling said edge portion adjacent said tapped hole;
(d) said retaining member having one leg portion bearing against said calibrating screw at one side of said actuating member and the other leg portion bearing against said screw at the other side of said actuating member, the intermediate portion of said retaining member being stressed to urge said leg portions both against said screw;
(e) said resilient retaining member acting on said calibrating screw to tend to twist said screw in a plane parallel to its axis, to press said screw against the sides of said tapped hole to frictionally resist accidental turning.

References Cited by the Examiner
UNITED STATES PATENTS

| 1,059,756 | 4/13 | Pilant | 151—26 |
| 1,082,735 | 12/13 | Chesher | 151—26 |

KATHLEEN H. CLAFFY, *Primary Examiner.*
BERNARD A. GILHEANY, *Examiner.*